(12) United States Patent
Kato et al.

(10) Patent No.: US 12,043,697 B2
(45) Date of Patent: Jul. 23, 2024

(54) EPOXY RESIN COMPOSITION AND CURED PRODUCT THEREOF

(71) Applicant: SUMITOMO CHEMICAL COMPANY, LIMITED, Tokyo (JP)

(72) Inventors: Hirofumi Kato, Osaka (JP); Kenichi Takeuchi, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 223 days.

(21) Appl. No.: 17/296,767

(22) PCT Filed: Oct. 16, 2019

(86) PCT No.: PCT/JP2019/040648
§ 371 (c)(1),
(2) Date: May 25, 2021

(87) PCT Pub. No.: WO2020/110493
PCT Pub. Date: Jun. 4, 2020

(65) Prior Publication Data
US 2022/0025106 A1   Jan. 27, 2022

(30) Foreign Application Priority Data
Nov. 27, 2018  (JP) .................................. 2018-220978

(51) Int. Cl.
C08G 59/24 (2006.01)
C08G 59/40 (2006.01)
C08G 59/62 (2006.01)
C08G 59/68 (2006.01)
C08J 5/24 (2006.01)

(52) U.S. Cl.
CPC ....... *C08G 59/245* (2013.01); *C08G 59/4007* (2013.01); *C08G 59/621* (2013.01); *C08G 59/686* (2013.01); *C08J 5/249* (2021.05); *C08J 2363/02* (2013.01)

(58) Field of Classification Search
CPC .................................................. C08G 59/245
See application file for complete search history.

(56) References Cited

U.S. PATENT DOCUMENTS

| | | | |
|---|---|---|---|
| 4,845,234 A | 7/1989 | Schneider et al. | |
| 5,464,910 A * | 11/1995 | Nakatsuka | C08G 59/18 528/96 |
| 2003/0171456 A1 | 9/2003 | Tong et al. | |
| 2004/0075802 A1* | 4/2004 | Kitamura | C08G 59/686 257/E23.119 |
| 2008/0003369 A1* | 1/2008 | Uenishi | C08L 63/00 427/372.2 |

FOREIGN PATENT DOCUMENTS

| | | |
|---|---|---|
| DE | DD-289280 A5 | 4/1991 |
| EP | 0 118 270 A2 | 9/1984 |
| EP | 0 385 745 A2 | 9/1990 |
| EP | 0 942 028 A1 | 9/1999 |
| EP | 2 161 739 A1 | 3/2010 |
| JP | S59-168023 A | 9/1984 |
| JP | 2000-351831 A | 12/2000 |
| JP | 2004-111380 A | 4/2004 |
| JP | 2013-032510 A | 2/2013 |
| JP | 2015-083634 A | 4/2015 |

OTHER PUBLICATIONS

International Searching Authority, "International Search Report," issued in connection with International Patent Application No. PCT/JP2019/040648, dated Dec. 24, 2019.
International Searching Authority, "Written Opinion," issued in connection with International Patent Application No. PCT/JP2019/040648, dated Dec. 24, 2019.
European Extended Search Report issued in corresponding European Patent Application No. 19891316.2 dated Jul. 21, 2022 (7 pages).
Office Action issued in corresponding Chinese Patent Application No. 201980077563.1 dated Feb. 27, 2023 (9 pages).
Office Action issued in corresponding Chinese Patent Application No. 201980077563.1 dated Sep. 28, 2023 (7 pages).
Office Action issued in corresponding Japanese Patent Application No. 2018-220978 dated Sep. 20, 2022 (6 pages).

* cited by examiner

Primary Examiner — Megan McCulley
(74) Attorney, Agent, or Firm — Foley & Lardner LLP

(57) ABSTRACT

An epoxy resin composition and a cured product thereof are provided, the epoxy resin composition comprising an epoxy resin (A), a curing agent (B) comprising a compound represented by the following formula (B-1) (wherein $R^1$ represents a hydrogen atom, a halogen atom, a methoxy group or a hydrocarbon group having 1 to 12 carbon atoms), and an imidazole adduct-type curing accelerator (C), wherein the molar ratio of the content of a phenolic hydroxide group to the content of an epoxy group in the epoxy resin composition is 0.25 to 0.67.

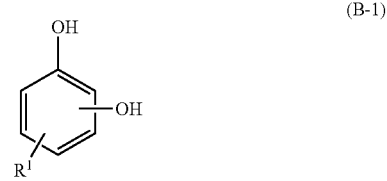

(B-1)

10 Claims, No Drawings

EPOXY RESIN COMPOSITION AND CURED PRODUCT THEREOF

CROSS-REFERENCE TO RELATED APPLICATIONS

The present application claims priority under 37 U.S.C. § 371 to International Patent Application No. PCT/JP2019/040648, filed Oct. 16, 2019, which claims priority to and the benefit of Japanese Patent Application No. 2018-220978, filed on Nov. 27, 2018. The contents of these applications are hereby incorporated by reference in their entireties.

TECHNICAL FIELD

The present invention relates to an epoxy resin composition and a cured product thereof.

BACKGROUND ART

Epoxy resins are applied to various applications such as for fiber reinforcing materials, electronic components, adhesive agents, coating materials and the like since cured products thereof are excellent in heat resistance, strength, chemical resistance, adhesiveness and the like.

In various applications, compositions containing an epoxy resin (hereinafter, referred to as "epoxy resin compositions") usually contain a curing agent to cure the compositions, and in some cases, further contain a curing accelerator (for example, Japanese Patent Laid-Open No. 2015-083634 (Patent Literature 1) and Japanese Patent Laid-Open No. 2013-032510 (Patent Literature 2)).

CITATION LIST

Patent Literature

Patent Literature 1: Japanese Patent Laid-Open No. 2015-083634
Patent Literature 2: Japanese Patent Laid-Open No. 2013-032510

SUMMARY OF INVENTION

Technical Problem

For the epoxy resin compositions, properties according to applications thereof are demanded. For the epoxy resin compositions, from the viewpoint of workability, a long pot life is generally demanded, and from the viewpoint of the productivity of products comprising cured products of the epoxy resin compositions, excellent curability (low-temperature curability, quick curability) is demanded.

Then, for cured products of the epoxy resin compositions, depending on applications thereof, a high heat resistance is demanded, and the tensile property is demanded in some cases.

An object of the present invention is to provide an epoxy resin composition having good pot life and curability and capable of providing a cured product exhibiting the good heat resistance and tensile property, and a cured product thereof.

Solution to Problem

The present invention provides an epoxy resin composition and a cured product shown below.

[1] An epoxy resin composition, comprising:
an epoxy resin (A);
a curing agent (B) comprising a compound represented by the following formula (B-1):

[Formula 1]

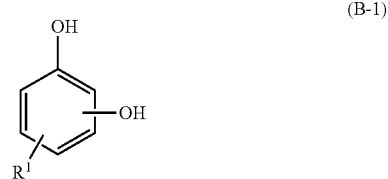

wherein $R^1$ represents a hydrogen atom, a halogen atom, a methoxy group or a hydrocarbon group having 1 to 12 carbon atoms; and
an imidazole adduct-type curing accelerator (C),
wherein the molar ratio of the content of a phenolic hydroxide group to the content of an epoxy group in the epoxy resin composition is 0.25 to 0.67.

[2] The epoxy resin composition according to [1], wherein the epoxy resin (A) comprises an epoxy resin having two epoxy groups in one molecule thereof.

[3] The epoxy resin composition according to [1] or [2], wherein the compound has a melting point of 150° C. or less.

[4] The epoxy resin composition according to any one of [1] to [3], wherein the molar ratio is 0.35 to 0.5.

[5] The epoxy resin composition according to any one of [1] to [4], wherein the curing agent (B) further comprises a compound represented by the following formula (B-2):

[Formula 2]

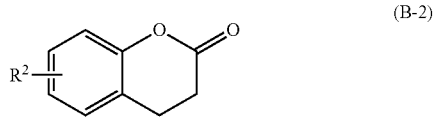

wherein $R^2$ represents a hydrogen atom, a halogen atom, a methyl group or a methoxy group.

[6] A cured product of an epoxy resin composition according to any one of [1] to [5].

[7] A prepreg, comprising an epoxy resin composition according to any one of [1] to [5], and a fiber.

[8] A composition, comprising a cured product of an epoxy resin composition according to any one of [1] to [5], and a fiber.

Advantageous Effects of Invention

An epoxy resin composition having good pot life and curability and capable of providing a cured product exhibiting the good heat resistance and tensile property, and a cured product thereof can be provided.

DESCRIPTION OF EMBODIMENTS

<Epoxy Resin Composition>

The epoxy resin composition according to the present invention (hereinafter, referred to also as "epoxy resin composition") comprises the following components:
- an epoxy resin (A);
- a curing agent (B); and
- an imidazole adduct-type curing accelerator (C).

The curing agent (B) comprises a compound represented by the above formula (B-1) (hereinafter, referred to also as "compound (B-1)").

Hereinafter, there will be described in detail each component which is contained or may be contained in the epoxy resin composition, and the epoxy resin composition.

Compounds exemplified herein as each component which is contained or may be contained in the curable composition each can be used, unless otherwise specified, singly or in combinations of a plurality thereof.

[1] Epoxy Resin (A)

The epoxy resin (A) is not particularly limited as long as it has one or more epoxy groups in one molecule thereof, but from the viewpoint of curability of the epoxy resin composition and the heat resistance, the strength and the like of the cured product, preferably comprises an epoxy resin having two or more epoxy groups in one molecule thereof, and more preferably comprises an epoxy resin having two epoxy groups in one molecule thereof.

Examples of the epoxy resin having two or more epoxy groups in one molecule thereof include:

aromatic glycidyl ether-type epoxy resins, which can be obtained by reaction, with epichlorohydrin, of a polyhydric phenol compound such as a novolac resin obtained by condensation or cocondensation, with aldehydes, of bisphenol A, bisphenol F, bisphenol AD, bisphenol S, biphenyldiol, naphthalenediol or phenols;

aliphatic glycidyl ether-type epoxy resins, which can be obtained by reaction, with epichlorohydrin, of a polyhydric alcohol compound such as 1,4-butanediol, 1,6-hexanediol, polyethylene glycol, polypropylene glycol, neopentyl glycol, glycerin, pentaerythritol, or sorbitol;

glycidyl ester-type epoxy resins, which can be obtained by reaction, with epichlorohydrin, of a polybasic acid such as phthalic acid, hexahydrophthalic acid or a dimer acid;

glycidyl amine-type epoxy resins, which can be obtained by reaction, with epichlorohydrin of an amine such as aniline, toluidine, diaminodiphenylmethane, p-aminophenol or p-aminocresol; and alicyclic epoxy resins, which can be obtained by oxidizing, with a peracid (peracetic acid or the like), an olefinic compound having two or more unsaturated bonds in its molecule, such as soybean oil or polybutadiene, or a cyclic olefin compound having two or more unsaturated bonds in its molecule, such as indene, 4-vinyl-1-cyclohexene or 3-cyclohexenylmethyl 3-cyclohexene-1-carboxylate.

The epoxy resins exemplified in the above may be epoxy resins having two epoxy groups in their molecule.

Examples of the aromatic glycidyl ether-type epoxy resin having two epoxy groups in its molecule include bisphenol A epoxy resins, bisphenol F epoxy resins, bisphenol AD epoxy resins, bisphenol S epoxy resins, biphenyldiol epoxy resins and naphthalenediol epoxy resins.

Examples of the aliphatic glycidyl ether-type epoxy resin having two epoxy groups in its molecule include hydrogenated bisphenol A epoxy resins, 1,4-butanediol diglycidyl ether, 1,6-hexanediol diglycidyl ether, polyethylene glycol diglycidyl ether, polypropylene glycol diglycidyl ether and neopentyl glycol diglycidyl ether.

Examples of the glycidyl ester-type epoxy resin having two epoxy groups in its molecule include diglycidyl phthalate, diglycidyl hexahydrophthalate and dimer acid diglycidyl esters.

Examples of the glycidyl amine-type epoxy resin having two epoxy groups in its molecule include glycidylaniline and glycidyltoluidine.

From the viewpoint of the viscosity and the curability of the epoxy resin and the epoxy resin composition and the heat resistance, the strength and the like of the cured product, the epoxy resin (A) is preferably an aromatic glycidyl ether-type epoxy resin, more preferably a bisphenol epoxy resin and further preferably a bisphenol A epoxy resin.

The epoxy resin (A) preferably contains a liquid epoxy resin, and when the epoxy resin (A) contains one or two or more epoxy resins, the epoxy resin (A) is more preferably liquid as the epoxy resin (A) as a whole.

In the present specification, "liquid" refers to exhibiting fluidity at 25° C. In the present specification, a substance being "liquid" usually has viscousness, and its viscosity is a viscosity at 25° C. measured by a viscometer (EMS viscometer) using an electro magnetically spinning method, which may be 0.0001 Pa·s to 1,000 Pa·s and may also be 0.001 Pa·s to 500 Pa·s.

The case of being "liquid" includes being in such a state that one or more components are dispersed in the other components.

Examples of the case where the epoxy resin (A) is liquid as a whole include the following.
a) The case where the epoxy resin (A) is composed of one liquid epoxy resin.
b) The case where the epoxy resin (A) is a mixture of two or more liquid epoxy resins.
c) The case where the epoxy resin (A) is a mixture of one or more liquid epoxy resins and one or more solid epoxy resins, and the mixture is liquid.
d) The case where the epoxy resin (A) is a mixture of two or more solid epoxy resins, and the mixture is liquid.

Therefore, the epoxy resin (A) can contain a solid epoxy resin. In the present specification, "solid" refers to being solid at 25° C. A solid epoxy resin may be dissolved or dispersed in a liquid epoxy resin. In order to carry out the curing reaction homogeneously, it is preferable that the solid epoxy resin be homogeneously dissolved.

From the viewpoint of adjusting the viscosity of the epoxy resin composition in a preferable range, the viscosity of the epoxy resin (A) (in the case of containing two or more epoxy resins, the viscosity of a mixture of the two or more epoxy resins) as a viscosity at 25° C. by an EMS viscometer is preferably 50 Pa·s or less, more preferably 40 Pa·s or less and further preferably 20 Pa·s or less.

The viscosity at 25° C. of the epoxy resin (A) is usually 0.01 Pa·s or more, may be 0.1 Pa·s or more and may also be 1 Pa·s or more.

Epoxy resins having two or more epoxy groups in their molecule may be used singly or in combination of two or more.

Combination use of a bisphenol A epoxy resin and a biphenyl epoxy resin is preferable because such use may sometimes function advantageously in satisfaction of both the good heat resistance and the good tensile property.

It is preferable that the epoxy resin (A) comprises an epoxy resin having two epoxy groups in its molecule.

The epoxy resin (A) may comprise one or more epoxy resins selected from the group consisting of epoxy resins having two epoxy groups in their molecule, epoxy resins having one epoxy group in their molecule and epoxy resins having three or more epoxy groups in their molecule.

The content of the epoxy resin having two epoxy group in its molecule in the epoxy resin (A) is, in 100 parts by mass of the epoxy resin (A), for example, 50 parts by mass or more, and from the viewpoint of the properties (heat resistance and/or the tensile property and the like) of the cured product of the epoxy resin composition, and the like, preferably 60 parts by mass or more, more preferably 70 parts by mass or more, further preferably 80 parts by mass or more and particularly preferably 90 parts by mass or more, and may also be 100 parts by mass.

The epoxy equivalent of the epoxy resin (A) (in the case of containing two or more epoxy resins, the epoxy equivalent of a mixture of the two or more epoxy resins) is, from the viewpoint of the tensile property, the heat resistance, the strength and the like of the cured product of the epoxy resin composition, preferably 30 g/eq to 500 g/eq, more preferably 40 g/eq to 400 g/eq, further preferably 50 g/eq to 300 g/eq and particularly preferably 50 g/eq to 250 g/eq.

The epoxy equivalent of the epoxy resins can be measured according to JIS K7236.

[2] Curing Agent (B)

The curing agent (B) comprises a compound capable of crosslinking and curing the epoxy resin (A). As such a compound, the curing agent (B) comprises a compound (B-1) represented by the above formula (B-1).

$R^1$ in the above formula (B-1) represents a hydrogen atom, a halogen atom, a methoxy group or a hydrocarbon group having 1 to 12 carbon atoms.

The curing agent (B) may comprise one compound within the scope of compound (B-1) or may contain two or more compounds within the scope of compound (B-1).

By adding a predetermined amount of the compound (B-1) to the epoxy resin composition, it becomes enabled to achieve satisfaction of both the good heat resistance and the good tensile property in the cured product of the epoxy resin composition.

The halogen atom in $R^1$ includes a fluorine atom, a chlorine atom, a bromine atom and an iodine atom.

The hydrocarbon group having 1 to 12 carbon atoms in $R^1$ includes aliphatic groups (alkyl groups and the like), alicyclic groups (cycloalkyl groups and the like), aromatic groups, hydrocarbon groups composed of a combination of an aliphatic group with an alicyclic group, and hydrocarbon groups composed of a combination of an aromatic group and an aliphatic group and/or an alicyclic group.

The number of carbon atoms of the hydrocarbon group is preferably 1 to 8. From the viewpoint of the viscosity of the epoxy resin composition, the hydrocarbon group is a methyl group or a 1-phenylethyl group.

$R^1$ is preferably a hydrogen atom or a hydrocarbon group, and more preferably a hydrogen atom.

The positional relation of two OH groups of the compound (B-1) may be any of the ortho position, the meta position and the para position, but is, from the viewpoint of reducing the viscosity of the epoxy resin composition and from the viewpoint of suppressing crystal deposition in the epoxy resin composition, preferably the ortho position and the meta position, and more preferably the meta position.

From the viewpoint of reducing the viscosity of the epoxy resin composition, from the viewpoint of suppressing crystal deposition in the epoxy resin composition and from the viewpoint of reducing the dissolving temperature in preparation of the epoxy resin composition, the compound (B-1) is preferably a compound having a melting point of 150° C. or less and more preferably a compound having a melting point of 130° C. or less.

Examples of the compound (B-1) having a melting point of 150° C. or less include catechol (1,2-dihydroxybenzene), resorcinol (1,3-dihydroxybenzene), 4-fluoro-1,3-dihydroxybenzene, 2-chloro-1,3-dihydroxybenzene, 4-chloro-1,3-dihydroxybenzene, 2-methoxy-1,3-dihydroxybenzene, 4-methoxy-1,3-dihydroxybenzene, 5-methoxy-1,3-dihydroxybenzene, 4-methyl-1,3-dihydroxybenzene, 5-methyl-1,3-dihydroxybenzene, 2-ethyl-1,3-dihydroxybenzene, 4-ethyl-1,3-dihydroxybenzene, 5-ethyl-1,3-dihydroxybenzene and 4-(1-phenylethyl)-1,3-dihydroxybenzene.

In the epoxy resin composition according to one preferred embodiment, the compound (B-1) comprises 1,3-dihydroxybenzene.

The epoxy resin composition may contain, together with the compound (B-1), a compound having three or more phenolic hydroxide groups. By adding such a compound to the epoxy resin composition, the properties (the heat resistance and/or the tensile property and the like) of the cured product of the epoxy resin composition may be improved in some cases.

Examples of the compound having three or more phenolic hydroxide groups include compounds in which one hydrogen atom bonded directly to the benzene ring of the compound (B-1) is replaced by a hydroxide group, phenol resins and novolac resins.

Then, the epoxy resin composition may contain, together with the compound (B-1), a compound having one phenolic hydroxide group. The compound having one phenolic hydroxide group includes phenol, cresol, xylenol and t-butylphenol.

The molar ratio of the content of the phenolic hydroxide group in the epoxy resin composition to the content of the epoxy group therein is made to be 0.25 to 0.67. Thereby, in the cured product of the epoxy resin composition, it becomes enabled to achieve satisfaction of both the good heat resistance and the good tensile property.

The "content of the epoxy group in the epoxy resin composition" refers to the number (molar number) of epoxy groups of the epoxy resin (A).

The "content of the phenolic hydroxide group" is the content of the phenolic hydroxide group in the epoxy resin composition, and refers to the total of the number (molar number) of the phenolic hydroxide group of the compound (B-1) and the number (molar number) of the phenolic hydroxide group of phenolic compounds having a phenolic hydroxide group other than the compound (B-1).

There is not clarified the reason why by making the molar ratio of the content of the phenolic hydroxide group in the epoxy resin composition to the content of the epoxy group therein to be in the above range, in the cured product of the epoxy resin composition, while the good heat resistance is maintained, the good tensile property is provided, but it is presumed that an adduct (addition reaction product) of the epoxy resin (A) and the compound (B-1) is produced in a suitable amount in the curing reaction, and the epoxy groups of the adducts are polymerized to form a cured product. The adduct is, when the epoxy resin (A) is an epoxy resin having two epoxy groups in its molecule, for example, a 2:1 adduct of the epoxy resin (A) and the compound (B-1). The adduct has epoxy groups on both terminals, and these epoxy groups become reaction points (crosslinking points) with epoxy groups of other adducts and/or the epoxy resin (A).

It is presumed that since the adduct gives a longer distance between crosslinking points than the epoxy resin (A) itself, the cured product good in the tensile property is obtained.

When the above molar ratio is less than 0.25, in the cured product of the epoxy resin composition, a sufficient tensile property cannot be provided. This is presumed to be caused by insufficiency of the amount of the adduct produced.

When the above molar ratio is more than 0.67, in the cured product of the epoxy resin composition, a sufficient heat resistance cannot be provided. This is presumed because too much an amount of the adduct produced reduces the number of crosslinking points.

From the viewpoint of achieving satisfaction of both the good heat resistance and the good tensile property, the above molar ratio is preferably 0.3 or more, more preferably 0.35 or more and further preferably 0.4 or more. Then, the molar ratio is preferably 0.6 or less, more preferably 0.55 or less and further preferably 0.5 or less. When the molar ratio is in this range, satisfaction of both the good heat resistance and the good tensile property can be achieved, and particularly the property of the elongation at break can be enhanced. Therefore, the molar ratio is preferably 0.3 to 0.6, more preferably 0.35 to 0.55 and further preferably 0.4 to 0.5.

The content of the compound (B-1) in the epoxy resin composition is not particularly limited as long as being in the above range, but is for example, 7.3 parts by mass to 19.4 parts by mass, preferably 8.7 parts by mass to 16.0 parts by mass and more preferably 10.2 parts by mass to 14.5 parts by mass based on 100 parts by mass of the epoxy resin (A).

The curing agent (B) may further comprise a compound represented by the above formula (B-2) (hereinafter, referred to also as compound (B-2)).

In the above formula (B-2), $R^2$ represents a hydrogen atom, a halogen atom, a methyl group or a methoxy group.

The curing agent (B) may comprise one of the compounds within the scope of compound (B-2) or may contain two or more of the compounds within the scope of the compound (B-2).

Inclusion of the compound (B-2) in the epoxy resin composition may become advantageous in the viscosity reduction of the epoxy resin composition.

Inclusion of the compound (B-2) in the epoxy resin composition may become advantageous in that in the cured product of the epoxy resin composition, the tensile property is further enhanced. At this time, the property of the elongation at break of the cured product can be further enhanced without reducing the heat resistance thereof.

The halogen atom in $R^2$ includes a fluorine atom, a chlorine atom, a bromine atom and an iodine atom.

$R^2$ is, from the viewpoint of the melting point, preferably a hydrogen atom, a methyl group or a methoxy group, and more preferably a hydrogen atom.

In the epoxy resin composition according to one preferred embodiment, the compound (B-1) comprises 1,3-dihydroxybenzene; the epoxy resin composition further comprises the compound (B-2); and the compound (B-2) comprises dihydrocoumarin ($R^2$: hydrogen atom).

When the epoxy resin composition comprises the compound (B-2), the content of the compound (B-2) in the epoxy resin composition is for example, 0.1 parts by mass or more, and from the viewpoint of effectively developing the above effect, preferably 1 part by mass or more and more preferably 2 parts by mass or more based on 100 parts by mass of the epoxy resin (A).

When the content of the compound (B-2) in the epoxy resin composition is excessively high, curing of the epoxy resin composition may become insufficient. Therefore, when the epoxy resin composition comprises the compound (B-2), the content of the compound (B-2) in the epoxy resin composition is preferably 50 parts by mass or less, more preferably 40 parts by mass or less and further preferably 30 parts by mass or less based on 100 parts by mass of the epoxy resin (A).

When the epoxy resin composition comprises, together with the compound (B-1), the compound (B-2), from the viewpoint of the curability of the epoxy resin composition, the ratio of the content of the compound (B-2) to the content of the compound (B-1) is, in mass ratio, preferably 0.01 to 6.9, more preferably 0.06 to 4.6 and further preferably 0.14 to 3.0.

The epoxy resin composition may further contain other curing agents for epoxy resins than those described above as long as not inhibiting the advantageous effects of the present invention. The other curing agents for epoxy resins may be conventionally known curing agents.

However, from the viewpoint of the heat resistance, the tensile property and the like of the cured product of the epoxy resin composition, the content of the other curing agents for epoxy resins in the curing agent (B) is preferably 20 parts by mass or less, more preferably 10 parts by mass or less, further preferably 5 parts by mass or less and particularly preferably 1 part by mass or less (for example, 0 parts by mass) with the total amount of the curing agent (B) being taken to be 100 parts by mass.

[3] Imidazole Adduct-Type Curing Accelerator (C)

In the present specification, the term "curing accelerator" refers to an agent having a function of promoting the curing reaction. The term "promoting" used herein also includes the case where the curing reaction is initiated.

In the present invention, among the curing accelerators, the imidazole adduct-type curing accelerator (C) is used. The use of the imidazole adduct-type curing accelerator (C) enables both the good pot life and the good curability (quick curability and the like) to be satisfied in the epoxy resin composition. This is presumed because since the imidazole adduct-type curing accelerator (C) can effectively initiate and/or promote the curing reaction between the epoxy resins (A) and the curing reaction between the epoxy resin (A) and the compound (B-1) and compound (B-2), and generally has latency, the imidazole adduct-type curing accelerator (C) functions advantageously in the elongation of the pot life.

The use of the imidazole adduct-type curing accelerator (C) as the curing accelerator is advantageous also in enabling the curing reaction at a relatively low temperature, and is advantageous also in increasing the storage stability of the epoxy resin composition.

The imidazole adduct-type curing accelerator (C) may be used singly or in combination of two or more.

The "latency" refers to such a property that whereas a substance can be stored stably at room temperature (25° C.) in the presence of an epoxy resin or even in the presence of an epoxy resin and a curing agent, it can perform a function of promoting the curing reaction by heat, light, pressure or the like.

The imidazole adduct-type curing accelerator (C) to be used in the present invention preferably has such a property (thermal latency) that it can perform a function of promoting the curing reaction by heat.

The imidazole adduct-type curing accelerator (C) is a compound in which an adding substance is added to an imidazole compound. The addition of the adding substance imparts the latency. The adding substance is, for example, a compound which is capable of being bonded to a N atom, preferably the N atom on the 1-position, of an imidazole ring by the reaction with the imidazole compound. The bond is usually a covalent bond.

The adding substance is preferably a compound capable of imparting good latency, and examples thereof include epoxy compounds, isocyanate compounds, (meth)acrylic compounds and urea compounds.

The imidazole adduct-type curing accelerator (C) is preferably a polymeric compound obtained by reacting an imidazole compound with the adding substance.

The adduct may be made further into a solid solution with a phenol resin or the like, or may be subjected to a surface treatment with an organic acid, a borate compound or the like.

The imidazole adduct-type curing accelerator (C) thus produced is usually crushed into a particle size of about 0.5 to 50 μm, and is dispersed in an epoxy resin and used.

Since the imidazole adduct-type curing accelerator (C) is generally low in solubility at room temperature to an epoxy resin, the imidazole adduct-type curing accelerator (C) mixed with the epoxy resin exhibits thermal latency in many cases.

The imidazole adduct-type curing accelerator (C) can be produced by a method disclosed in known Patent Literatures, for example, Japanese Patent Laid-Open Nos. 59-053526, 60-004524, 60-072917, 2005-206744, 06-073156, 06-172495, 2008-214567 and 2014-177525.

As the imidazole adduct-type curing accelerator (C), commercially available products may be used. The commercially available products of the imidazole adduct-type curing accelerator (C) include, in trade names, "Fujicure FXR-1020", "Fujicure FXR-1030", "Fujicure FXR-1032", "Fujicure FXR-1081", "Fujicure FXR-1121" and "Fujicure FXR-1131" (the forgoing, manufactured by T&K TOKA CO., LTD.); "Adeka Hardner EH-5011S" and "Adeka Hardner EH-5046S" (the forgoing, manufactured by ADEKA Corporation); "Curadduct P-0505" (manufactured by SHIKOKU CHEMICALS CORPORATION); "Amicure PN-23", "Amicure PN-23J", "Amicure PN-31", "Amicure PN-31J", "Amicure PN-40", "Amicure PN-40J", "Amicure PN-50", "Amicure PN-F" and "Amicure PN-H" (the forgoing, manufactured by Ajinomoto Fine-Techno Co., Inc.).

The epoxy resin composition may contain one or two or more other curing accelerators than the imidazole adduct-type curing accelerator (C) as long as not inhibiting the advantageous effects of the present invention.

The other curing accelerators are not particularly limited, and examples thereof include tertiary amine compounds and salts thereof, imidazole compounds (non-adduct type), imidazolium salts, phosphorus-based compounds such as triphenylphosphine and phosphonium salts, metal carboxylates and 2,3-dihydro-1H-pyrrolo[1,2-a]benzimidazole (TBZ).

From the viewpoint of more effectively developing the above effect, the content of the other curing accelerators in the curing accelerator is preferably 20 parts by mass or less, more preferably 10 parts by mass or less, further preferably 5 parts by mass or less and particularly preferably 1 part by mass or less (for example, 0 parts by mass) with the total amount of the curing accelerator being taken to be 100 parts by mass.

The content of the imidazole adduct-type curing accelerator (C) in the epoxy resin composition is, for example, 1 part by mass to 50 parts by mass based no 100 parts by mass of the epoxy resin (A), and from the viewpoint of more effectively developing the above effect, preferably 2 parts by mass to 40 parts by mass, more preferably 3 parts by mass to 30 parts by mass, further preferably 5 parts by mass to 20 parts by mass and particularly preferably 5 parts by mass to 15 parts by mass.

[4] Other Blend Components

The epoxy resin composition can further contain other blend components than the above-mentioned components.

Examples of the other blend components include rubber particles, inorganic particles (particles composed of metals, metal oxides and the like), flame retardants, surface treating agents, release agents, antibacterial agents, leveling agents, defoaming agents, thixotropic agents, heat stabilizers, light stabilizers, ultraviolet absorbents, colorants, coupling agents, surfactants, metal alkoxides, thermoplastic resins and diluents.

The other blend components may be used singly or in combination of two or more.

Addition of the rubber particles enables the cured product of the epoxy resin composition to maintain the good heat resistance and simultaneously improve the toughness.

When the viscosity reduction of the epoxy resin composition is taken into further consideration, when the rubber particles are added, concurrent addition of the above-mentioned compound (B-2) is preferable in some cases.

Examples of the rubber particles include core-shell type acrylic rubber particles, surface-modified acrylic rubber particles, crosslinked NBR particles and silicone rubber particles. These rubber particles may be conventionally known ones. The average particle diameter of the rubber particles is, for example, about 0.05 μm to 1 μm, and preferably 0.2 μm to 0.5 μm.

With regard to the rubber particles, one type thereof may be used alone, or two or more types thereof may be used in combination.

As the rubber particles, commercially available rubber particles may be used, or dispersion products in which the rubber particles are in advance dispersed in an epoxy resin may be used. Commercially available products of the rubber particles or the dispersion products include, in trade names, "Acryset BPA328" (manufactured by NIPPON SHOKUBAI CO., LTD.); "Kane Ace MX-153", "Kane Ace MX-154", "Kane Ace MX-257" and "Kane Ace MX-960" (the forgoing, manufactured by KANEKA CORPORATION); "Staphyloid AC" series (manufactured by Aica Kogyo Company, Limited); "Paraloid EXL" series (manufactured by Dow Chemical Co.); "Metablen" (manufactured by Mitsubishi Chemical Corporation); "XER-91" (manufactured by JSR Corporation); and "GENIOPERL P52" (manufactured by Wacker Asahikasei Silicone Co., Ltd.).

The content of the rubber particles in the epoxy resin composition is, for example, 1 part by mass to 100 parts by mass based on 100 parts by mass of the epoxy resin (A), and from the viewpoint of more effectively developing the above effect, preferably 5 parts by mass to 80 parts by mass and more preferably 10 parts by mass to 50 parts by mass.

The content of the rubber particles in the epoxy resin composition is, for example, 1% by mass to 50% by mass based on the whole composition, and from the viewpoint of more effectively developing the above effect, preferably 2% by mass to 30% by mass and more preferably 5% by mass to 20% by mass.

[5] The Epoxy Resin Composition

The epoxy resin composition according to the present invention comprising the epoxy resin (A), the compound (B-1) and the imidazole adduct-type curing accelerator (C) and other components optionally added is preferably liquid. The meaning of "liquid" is as described above.

In the liquid epoxy resin composition, all the components contained therein may be in a dissolved state or may be in such a state that one or more components are dispersed in the other components.

The liquid epoxy resin composition according to the present invention can have a relatively low viscosity. The relatively low viscosity may improve the productivity and the workability of products using the epoxy resin composition. For example, since a method for producing a molded material (composition) containing a cured product of the epoxy resin composition and fibers and the like comprises a step of impregnating textiles or bundles of the fibers with the epoxy resin composition, use of the low-viscosity epoxy resin composition enables the impregnability of the epoxy resin composition to be increased.

The viscosity of the epoxy resin composition is, as a viscosity at 25° C. by an EMS viscometer, preferably 50 Pa·s or less, more preferably 40 Pa·s or less, further preferably 35 Pa·s or less and particularly preferably 20 Pa·s or less. The viscosity at 25° C. of the epoxy resin composition is usually 0.01 Pa·s or more, and may be 0.1 Pa·s or more and may also be 1 Pa·s or more.

The epoxy resin composition according to the present invention can have a relatively long pot life. For example, the time until the viscosity of the epoxy resin composition becomes two times the initial viscosity may be 0.5 days or more, further 1 day or more, further 2 days or more, further 3 days or more and further 5 days or more.

The epoxy resin composition according to the present invention can exhibit good curability. That is, the epoxy resin composition can be cured fully in a relatively short heat curing time and/or at a relatively low temperature.

<Cured Product>

The cured product according to the present invention is the one made by curing the above epoxy resin composition according to the present invention.

Since being a cured product of the epoxy resin composition according to the present invention, the cured product of the epoxy resin composition according to the present invention can satisfy both the good heat resistance and the good tensile property.

The cured product according to the present invention can exhibit a glass transition temperature of, for example, 110° C. or more, further 115° C. or more, further 120° C. or more and further 130° C. or more.

The cured product according to the present invention can have, in the tensile strength and the elongation at break according to JIS K7161-1 and JIS K7161-2, a tensile strength of, for example, 30 MPa or more, further 45 MPa or more and further 60 MPa or more, and an elongation at break of, for example, 4.5% or more, further 5.5% or more, further 6.5% or more and further 7.5% or more.

The cured product according to the present invention can exhibit good toughness. The cured product according to the present invention may have a fracture toughness $K_{1c}$ according to ASTM D5045-14 of, for example, 0.5 MPa·m$^{1/2}$ or more, further 0.8 MPa·m$^{1/2}$ or more, further 1 MPa·m$^{1/2}$ or more, further 1.2 MPa·m$^{1/2}$ or more, further 1.4 MPa·m$^{1/2}$ or more and further 1.5 MPa·m$^{1/2}$ or more.

When the cured product according to the present invention is fabricated into a dumbbell test piece according to JIS K7139A-2 and the test piece is subjected to a tensile test at a tensile rate of 10 mm/min according to JIS K7161-1 and JIS K7161-2, the test piece as the cured product according to the present invention can exhibit a property of causing necking in breaking.

The necking means that the cross sectional area of the dumbbell test piece locally reduces in the vicinity of the broken surfaces of the test piece, and means that the cured product exhibits plastic deformation.

The above property becomes an index of the cured product exhibiting the good tensile property.

The epoxy resin composition and the cured product thereof according to the present invention, since the cured product is excellent in the heat resistance and excellent also in the tensile property, can be applied to various applications, and can be used, for example, as a resin composition for adhesives, encapsulation of electronic parts, and impregnation of fibers. Further the epoxy resin composition according to the present invention, since being low in viscosity (at 25° C., 50 Pa·s or less) and excellent in impregnability, and being cured in a short time by heating (for example, at 135° C., 15 min) and being excellent in productivity, can suitably be used as a resin composition for encapsulation of electronic parts and impregnation of fibers.

The present invention relates also to a product or a part comprising the above cured product. One example of the product is a molded material (composition) comprising the cured product and fibers and the like. The product or part comprising the cured product may contain components, for example, fibers, other than components originated from the epoxy resin composition (the cured product).

Hereinafter, a case of using the epoxy resin composition according to the present invention as a resin composition for impregnation of fibers will be described.

As the fibers to be concurrently used with the epoxy resin composition according to the present invention, fibers such as glass fibers, aramid fibers or kenaf fibers can be used. The surface of the fibers may be subjected to a known sizing treatment.

As a method for fabricating a molded material by making a complex of the epoxy resin composition according to the present invention with fibers, a known method can be used. The method specifically includes:

a wet filament winding method in which fibers are impregnated with the epoxy resin composition, and then wound and molded and heat cured on a molding metal mold such as a mandrel;

a dry filament winding method in which a tow prepreg obtained by impregnating fibers with the epoxy resin composition is in advance provided, and is wound and molded and heat cured on a molding metal mold such as a mandrel;

a resin transfer molding method in which a preform fabricated by fabricating textiles of fibers and laminating and press pressurizing the fiber textiles in a metal mold is vacuum impregnated with the epoxy resin composition and heat cured;

a sheet winding method in which a prepreg obtained by impregnating a textile of fibers with the epoxy resin composition is in advance provided, and wound and molded and heat cured on a molding metal mold such as a mandrel;

a press molding method in which prepregs obtained by impregnating textiles of fibers with the epoxy resin composition are in advance provided, and laminated in a metal mold, and heat and pressure cured by a press; and an autoclave molding method in which a prepreg obtained by impregnating a textile of fibers with the epoxy resin composition is in advance provided, and mounted on a molding jig and covered with a bag film, and heat and pressure cured in an autoclave.

EXAMPLES

Hereinafter, the present invention will be described more specifically by way of Examples, but the present invention is not limited to these Examples. In Examples, and "parts" indicating contents or amounts used are in terms of mass unless otherwise specified.

Examples 1 to 12, Comparative Examples 1 to 6

(1) Preparation of Epoxy Resin Compositions

Each component indicated in Table 1 and Table 2 provided below was mixed in an amount blended indicated in Table 1 and Table 2 provided below to thereby prepare epoxy resin compositions. In Table 1 and Table 2, the unit of the amount of each component blended is parts by mass. In all Examples and Comparative Examples, the epoxy resin compositions obtained were liquid (exhibiting fluidity at 25° C.)

The column of the "OH/EP molar ratio" in Table 1 and Table 2 shows the molar ratios of the contents of the phenolic hydroxide group in the epoxy resin compositions to the contents of the epoxy group therein, which are calculated from amounts charged.

In Examples in which rubber particles were added, compositions in which the rubber particles were dispersed in an epoxy resin were used as a blend component for preparation of the epoxy resin compositions.

Details of each blend component indicated in Table 1 and Table 2 are as follows.

[a] Epoxy resin 1: a liquid epoxy resin manufactured by Mitsubishi Chemical Corporation, trade name: "jER 828" (bisphenol A epoxy resin, epoxy equivalent: about 190 g/eq, viscosity: about 15 Pa·s (25° C.))

[b] Epoxy resin 2: a solid epoxy resin manufactured by Mitsubishi Chemical Corporation, trade name: "jER YX4000" (biphenyl epoxy resin, epoxy equivalent: about 190 g/eq, melting point: about 105° C.)

[c] Curing agent 1: 1,3-dihydroxybenzene (resorcin)

[d] Curing agent 2: dihydrocoumarin

[e] Curing agent 3: bisphenol A (2,2-bis(4-hydroxyphenyl)propane

[f] Curing accelerator 1: an imidazole adduct-type curing accelerator manufactured by T&K TOKA CO., LTD., trade name: "Fujicure FXR-1121" (latent)

[g] Curing accelerator 2: an imidazole adduct-type curing accelerator manufactured by ADEKA Corporation, trade name: "Adeka Hardner EH-5011S" (latent)

[h] Curing accelerator 3: an imidazole non-adduct-type curing accelerator manufactured by SHIKOKU CHEMICALS CORPORATION, trade name: "Curezol 2E4MZ" (non-adduct type, non-latent, chemical name: 2-ethyl-4-methylimidazol)

[i] Curing accelerator 4: dicyandiamide

[j] Rubber particle 1: acrylic rubber particles contained in trade name: "Acryset BPA328" manufactured by NIPPON SHOKUBAI CO., LTD. (a composition in which the acrylic rubber particles are dispersed in the above trade name "jER 828" being an epoxy resin); the amount of the epoxy resin blended contained in this composition is included in the amount blended described in the column of "Epoxy resin 1" in Table 1.

(2) Evaluation of the Epoxy Resin Compositions and Cured Products Thereof (2-1) The Viscosity and the Pot Life of the Epoxy Resin Compositions About 2 g of an epoxy resin composition was enclosed together with a 4.7 mm aluminum spherical probe in a test tube. The test tube was set on an EMS viscometer (EMS-1000), manufactured by Kyoto Electronics Manufacturing Co., Ltd.; and the viscosity of the epoxy resin composition was measured under the conditions of a motor rotation frequency of 1,000 rpm, a measurement time of 2 min or 1 min, and a measurement interval of 30 sec. The results are shown in Table 1 and Table 2.

For the epoxy resin composition of Comparative Example 1, since the viscosity was high, the viscosity at a temperature of 30° C. was measured.

While the test tube after the measurement was stored in a 25° C. thermostatic chamber, the viscosity of the epoxy resin composition was monitored by the EMS viscometer. The pot life was determined as a time (days) until the viscosity became two times the viscosity at the storage initiation. The results are shown in Table 1 and Table 2.

For the compositions obtained in Comparative Examples 1, 3 and 4, no measurement of the pot life was carried out.

(2-2) Curability of the Epoxy Resin Compositions

An epoxy resin composition was poured in a silicone mold heated at 135° C., and held at the temperature for 15 min to be subjected to a curing reaction of a layer of the epoxy resin composition.

After the curing reaction, the silicone mold was tilted and whether or not liquid dripping occurred was visually observed, and the curability (quick curability) of the epoxy resin composition was evaluated according to the following evaluation criteria. The results are shown in Table 1 and Table 2.

A: No liquid dripping occurred and the epoxy resin composition layer after the curing reaction was fully cured, and the epoxy resin composition had quick curability.

B: Since liquid dripping occurred, the curing of the epoxy resin composition layer after the curing reaction was insufficient, and the epoxy resin composition had no quick curability.

For the compositions obtained in Comparative Example 1, no evaluation of the curability was carried out. In the case of the epoxy resin composition of Comparative Example 4, when the curing reaction was carried out, scorching was caused on the epoxy resin composition layer and no cured product whose physical properties could be measured was obtained.

(2-3) Glass Transition Temperature (Tg) of the Cured Products

About 40 mg of a cured product of an epoxy resin composition obtained in the above (2-2) was weighed in an aluminum cell, and the glass transition temperature (Tg) was measured by using a differential scanning colorimeter (DSAC-60A) manufactured by SHIMADZU CORPORATION. The results are shown in Table 1 and Table 2.

The temperature was raised at a temperature-rise rate of 15° C./min from 25° C. to 135° C.; the temperature was held at 135° C. for 20 min; thereafter, the temperature was cooled at a temperature-fall rate of −10° C./min from 135° C. to 30° C.; and when the temperature was again raised at a temperature-rise rate of 10° C./min from 30° C. to 200° C., a DSC curve was observed and the middle point in the stepwise change in the DSC curve was taken as Tg (° C.).

For the cured product obtained in Comparative Examples 1, 3 and 4, no measurement of Tg was carried out.

(2-4) Tensile Property of the Cured Products

For the cured products of the epoxy resin compositions, the tensile property was measured according to JIS K7161-1 and JIS K7161-2.

Specifically, an epoxy resin composition was poured in a silicone mold, and cured under the same temperature condition as in the above (2-2) to thereby obtain a dumbbell test piece according to JIS K7139A-2.

On the test piece obtained, the tensile test was carried out at a rate of 10 mm/min according to JIS K7161-1 and JIS K7161-2 by using an Autograph (AGX-10kNXplus) manufactured by SHIMADZU CORPORATION. The results are shown in Table 1 and Table 2. In the measurement of the elongation at break, the distance between marked lines was calculated by using a video-type noncontact extensometer (TRview).

For the composition obtained in Comparative Examples 1, 3 and 4, no measurement of the tensile property was carried out.

Here, the above test pieces were fabricated from the cured products of Examples 1 to 12, and when the tensile test was carried out thereon at a rate of 10 mm/min according to JIS K7161-1 and JIS K7161-2 by using an Autograph (AGX-10kNXplus) manufactured by SHIMADZU CORPORATION, necking occurred in breaking.

(2-5) Fracture Toughness of the Cured Products

For the cured products having a thickness of 6 mm of the epoxy resin compositions, the fracture toughness $K_{1c}$ was measured according to ASTM D5045-14.

Specifically, an epoxy resin composition was poured in a silicone mold, and cured under the same temperature condition as in the above (2-2) to thereby obtain a cured product of 6 mm×150 mm×150 mm. A test piece of 6 mm×60 mm×12 mm was fabricated by cutting from the cured product, and notched by a 30° t1.0-isometric slicing blade and thereafter, the notch was pre-cracked.

On the pre-cracked test piece, a bending test was carried out at a rate of 1 mm/min according to ASTM D5045-14 by using a universal material testing machine (type: 5966) manufactured by Instron Corp. to measure the breaking load.

Further, a test piece of 6 mm×150 mm×12 mm was fabricated by cutting from the above cured product of 6 mm×150 mm×150 mm, and notched by a 30° t1.0-isometric slicing blade and thereafter, the notch was pre-cracked.

On the pre-cracked test piece, a bending test was carried out at a rate of 2.6 mm/min by using a universal material testing machine (type: 5966) manufactured by Instron Corp. to measure the 0.2% proof stress.

The 0.2% proof stress obtained in the bending test was used in place of the yield stress and the fracture toughness $K_{1c}$ (MPa·m$^{1/2}$) was calculated. The results are shown in Table 1 and Table 2.

The measurement of the fracture toughness $K_{1c}$ was carried out for the cured products obtained in Examples 3, 6, 7 and 12.

TABLE 1

|  |  | Examples |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| Epoxy resin (A) | Epoxy resin 1 | 100 | 100 | 100.0 | 90 | 100 | 100 | 100 | 100 | 100 | 100 | 90.0 | 100.0 |
|  | Epoxy resin 2 |  |  |  | 10 |  |  |  |  |  |  | 10 |  |
| Curing agent (B) | Curing agent 1 | 11.5 | 13.1 | 11.5 | 17.4 | 8.7 | 14.5 | 17.4 | 11.6 | 11.6 | 11.6 | 10.8 | 7.7 |
|  | Curing agent 2 |  |  |  |  |  |  |  | 5.0 | 10.0 | 20.0 | 10.0 | 10.0 |
|  | Curing agent 3 |  |  |  |  |  |  |  |  |  |  |  |  |
|  | OH/EP molar ratio | 0.39 | 0.45 | 0.39 | 0.60 | 0.30 | 0.50 | 0.60 | 0.40 | 0.40 | 0.40 | 0.37 | 0.27 |
| Curing accelerator (C) | Curing accelerator 1 | 7.2 |  | 7.3 | 6.0 | 10.5 | 7.5 | 6.0 | 7.2 | 7.2 | 7.2 | 7.2 | 7.2 |
|  | Curing accelerator 2 |  | 9.0 |  |  |  |  |  |  |  |  |  |  |
|  | Curing accelerator 3 |  |  |  |  |  |  |  |  |  |  |  |  |
|  | Curing accelerator 4 |  |  |  |  |  |  |  |  |  |  |  |  |
| Rubber particles | Rubber particle 1 |  |  |  | 6.3 |  |  |  |  |  |  | 6.7 | 6.6 |
|  | Content of rubber particles in epoxy resin composition (% by mass) |  |  |  | 5.0 |  |  |  |  |  |  | 5.0 | 5.0 |
| Evaluation results | Composition Viscosity (Pa·s) | 28 | 29 | 38 | 37 | 27 | 31 | 32 | 16 | 10 | 5 | 17 | 17 |
|  | Pot life (days) | 11 | 11 | 14 | 6 | >20 | 11 | 14 | 7 | 2 | 0.7 | 2 | 4 |
|  | Curability | A | A | A | A | A | A | A | A | A | A | A | A |
|  | Cured product Tg (° C.) | 117 | 125 | 127 | 115 | 136 | 118 | 113 | 129 | 123 | 118 | 129 | 133 |
|  | Tensile Strength (MPa) | 68 | 67 | 60 | 57 | 66 | 64 | 60 | 68 | 66 | 66 | 60 | 62 |
|  | Elongation at break (%) | 4.7 | 6.6 | 6.6 | 6.5 | 5.1 | 7.0 | 7.2 | 5.9 | 6.1 | 7.8 | 4.8 | 6.0 |
|  | Fracture toughness (MPa·m$^{1/2}$) | — | — | 1.7 | — | — | 0.8 | 0.9 | — | — | — | — | 1.6 |

TABLE 2

|  |  | Comparative Examples | | | | | |
| --- | --- | --- | --- | --- | --- | --- | --- |
|  |  | 1 | 2 | 3 | 4 | 5 | 6 |
| Epoxy resin (A) | Epoxy resin 1 | 100 | 100 | 100 | 100 | 100 | 100 |
|  | Epoxy resin 2 |  |  |  |  |  |  |
| Curing agent (B) | Curing agent 1 |  | 14.5 | 11.6 |  | 5.8 | 20.3 |
|  | Curing agent 2 |  |  |  |  |  |  |
|  | Curing agent 3 | 30.0 |  |  |  |  |  |
|  | OH/EP molar ratio | 0.50 | 0.50 | 0.40 | 0 | 0.20 | 0.70 |
| Curing accelerator (C) | Curing accelerator 1 | 7.5 |  |  | 15.0 | 12.0 | 4.5 |
|  | Curing accelerator 2 |  |  |  |  |  |  |
|  | Curing accelerator 3 |  | 2.5 |  |  |  |  |
|  | Curing accelerator 4 |  |  | 6.7 |  |  |  |
| Evaluation results | Composition Viscosity (Pa·s) | 110 (30° C.) | 23 | 26 | 20 | 24 | 29 |
|  | Pot life (days) | — | 0.1 | — | — | >20 | 11 |
|  | Curability | — | A | B | — | A | A |
|  | Cured product Tg (° C.) | — | 112 | — | — | 145 | 108 |
|  | Tensile Strength (MPa) | — | 45 | — | — | 41 | 56 |
|  | Elongation at break (%) | — | 7.6 | — | — | 1.8 | 12.2 |
|  | Fracture toughness (MPa·m$^{1/2}$) | — | — | — | — | — | — |

The invention claimed is:

1. An epoxy resin composition, comprising:
   an epoxy resin (A);
   a curing agent (B) comprising a compound represented by the following formula (B-1):

[Formula 1]

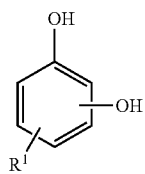

(B-1)

wherein R$^1$ represents a hydrogen atom, a halogen atom, a methoxy group or a hydrocarbon group having 1 to 12 carbon atoms; and
   an imidazole adduct curing accelerator (C), wherein the imidazole adduct curing accelerator (C) is a polymeric compound obtained by reacting an imidazole compound with an adding substance selected from the group consisting of isocyanate compounds, (meth)acrylic compounds and urea compounds;
   wherein a molar ratio of a content of a phenolic hydroxide group to a content of an epoxy group in the epoxy resin composition is 0.25 to 0.67.

2. The epoxy resin composition according to claim 1, wherein the epoxy resin (A) comprises an epoxy resin having two epoxy groups in one molecule.

3. The epoxy resin composition according to claim 1, wherein the compound represented by formula (B-1) has a melting point of 150° C. or less.

4. The epoxy resin composition according to claim 1, wherein the molar ratio is 0.35 to 0.5.

5. The epoxy resin composition according to claim 1, wherein the curing agent (B) further comprises a compound represented by the following formula (B-2):

[Formula 2]

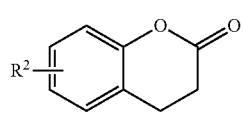

(B-2)

wherein R$^2$ represents a hydrogen atom, a halogen atom, a methyl group or a methoxy group.

6. A cured product of an epoxy resin composition according to claim 1.

7. A prepreg, comprising an epoxy resin composition according to claim 1, and a fiber.

8. A composition, comprising a cured product of an epoxy resin composition according to claim 1, and a fiber.

9. The epoxy resin composition of claim 1 consisting of the epoxy resin (A); the curing agent (B) and the imidazole adduct curing accelerator (C).

10. The epoxy resin composition of claim 1 consisting of the epoxy resin (A); the curing agent (B), the imidazole adduct accelerator (C) and rubber particles.

* * * * *